(12) United States Patent
Zhang (10) Patent No.: US 10,129,527 B2
(45) Date of Patent: Nov. 13, 2018

(54) CAMERA POSE ESTIMATION FOR MOBILE DEVICES

(71) Applicant: Google Inc., Mountain View, CA (US)

(72) Inventor: Li Zhang, Seattle, WA (US)

(73) Assignee: Google LLC, Mountain View, CA (US)

( * ) Notice: Subject to any disclaimer, the term of this patent is extended or adjusted under 35 U.S.C. 154(b) by 175 days.

(21) Appl. No.: 15/211,858

(22) Filed: Jul. 15, 2016

(65) Prior Publication Data

US 2017/0018086 A1    Jan. 19, 2017

Related U.S. Application Data

(60) Provisional application No. 62/193,321, filed on Jul. 16, 2015.

(51) Int. Cl.
| | |
|---|---|
| *H04N 7/18* | (2006.01) |
| *H04N 13/204* | (2018.01) |
| *G06T 7/73* | (2017.01) |
| *H04N 5/232* | (2006.01) |

(52) U.S. Cl.
CPC ............ *H04N 13/204* (2018.05); *G06T 7/73* (2017.01); *H04N 5/232* (2013.01); *G06T 2207/10016* (2013.01); *G06T 2207/30244* (2013.01)

(58) Field of Classification Search
CPC ...... H04N 13/0203; H04N 5/232; G06T 7/73; G06T 2207/10016; G06T 2207/30244
USPC ......................................................... 348/135
See application file for complete search history.

(56) References Cited

U.S. PATENT DOCUMENTS

| | | | |
|---|---|---|---|
| 5,495,576 A | 2/1996 | Ritchey | |
| 6,559,846 B1 * | 5/2003 | Uyttendaele | .......... G06T 15/005 345/473 |
| 6,571,024 B1 * | 5/2003 | Sawhney | ................ G06T 7/246 348/42 |

(Continued)

FOREIGN PATENT DOCUMENTS

WO    2017011793 A1    1/2017

OTHER PUBLICATIONS

Firoozfam et al., "A Conical Panoramic Stereo Imaging System for 3-D Scene Reconstruction", Proceedings of Oceans 2003, vol. 4, Sep. 22-26, 2003, pp. 2303-2308.

(Continued)

*Primary Examiner* — Michael Lee
(74) *Attorney, Agent, or Firm* — Brake Hughes Bellermann LLP (57) ABSTRACT

Systems and methods are described for estimating a camera pose. The estimation may include obtaining a sequence of images including a plurality of image frames of a scene, detecting a first set of feature points in a first image frame, and tracking the first set of feature points in a plurality of subsequent image frames. While continuing to track the first set of feature points, the estimation can include detecting a second set of feature points in a second image frame, tracking the second set of feature points, selecting a first initial camera pose associated with the first image frame and a second initial camera pose associated with the second image frame, determining projection locations, the projection locations based on the first initial camera pose and the second initial camera pose, and comparing the projection locations corresponding to each feature point in the first and second sets of feature points.

20 Claims, 5 Drawing Sheets

(56) References Cited

U.S. PATENT DOCUMENTS

| | | |
|---|---|---|
| 8,761,439 B1 | 6/2014 | Kumar et al. |
| 2004/0027451 A1 | 2/2004 | Baker |
| 2010/0158352 A1* | 6/2010 | Yu .................... H04N 5/2224 382/154 |
| 2013/0182984 A1* | 7/2013 | Masuda ................ B21K 1/40 384/484 |
| 2014/0285486 A1 | 9/2014 | Chang et al. |
| 2016/0148054 A1* | 5/2016 | Han .................... G06L 7/2053 382/103 |

OTHER PUBLICATIONS

Peleg et al., "Omnistereo: Panoramic Stereo Imaging", IEEE Transactions on Pattern Analysis and Machine Intelligence, vol. 23, No. 3, Mar. 2001, pp. 279-290.

Peleg et al., "Stereo Mosaicing from a Single Moving Video Camera", Proceedings of SPIE vol. 4297, 2001, pp. 98-106.

Richardt et al., "Megastereo: Constructing High-Resolution Stereo Panoramas", International Conference on Computer Vision and Pattern Recognition, 2013, pp. 1-8.

International Search Report and Written Opinion for PCT Patent Application No. PCT/US2016/042612, dated Nov. 8, 2016, 15 pages.

McLauchlan et al., "Image Mosaicing Using Sequential Bundle Adjustment", Image and Vision Computing, vol. 20, 2002, pp. 751-759.

Mouragnon et al., "Real Time Localization and 3D Reconstruction", Proceedings of the IEEE Computer Society Conference on Computer Vision and Pattern Recognition, 2006, 8 pages.

\* cited by examiner

CAMERA POSE ESTIMATION FOR MOBILE DEVICES

CROSS-REFERENCE TO RELATED APPLICATIONS

This application claims priority to and the benefit of U.S. Patent Application Ser. No. 62/193,321, entitled "Camera Pose Estimation for Mobile Devices," filed on Jul. 16, 2015, the disclosure of which is incorporated herein by reference.

TECHNICAL FIELD

This description generally relates to pose estimation. In particular, the description relates to estimating camera pose metrics when generating 3D stereoscopic images for display in virtual reality (VR) environment.

BACKGROUND

The combination of orientation and position of an object observed in an image is typically referred to as the pose of the object. The pose of the object may be referenced in relation to the position or orientation of the object relative to a coordinate system. In general, the coordinate system can be used to describe the pose with reference to a rotation and translation transformation.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method includes obtaining a sequence of images including a plurality of image frames of a scene, detecting a first set of feature points in a first image frame, tracking the first set of feature points in a plurality of subsequent image frames and while continuing to track the first set of feature points, detecting a second set of feature points in a second image frame, tracking the second set of feature points in the plurality of subsequent image frames, and selecting a first initial camera pose associated with the first image frame and a second initial camera pose associated with the second image frame. The method may also include determining a plurality of projection locations corresponding to each feature point in the first set of feature points and the second set of feature points in which the projection locations are based at least in part on the first initial camera pose and the second initial camera pose. The method may also include comparing the projection locations corresponding to each feature point in the first set of feature points and each feature point in the second set of feature points to the corresponding tracked first set of feature points and the tracked second set of feature points, and in response to determining that the projection locations meet a predefined threshold associated with the tracked first and second set of feature points, the method can include generating an updated camera pose for the first image frame and the second image frame. Other embodiments of this aspect include corresponding computer systems, apparatus, and computer programs recorded on one or more computer storage devices, each configured to perform the actions of the methods.

Implementations may include one or more of the following features. The computer-implemented method further including providing the updated camera pose for the first image frames and the second image frames based at least in part on determining that the projection locations meet the predefined threshold. The computer-implemented method in which selecting a first initial camera pose and a second initial camera pose includes obtaining gyroscope data associated with each image frame in the plurality of image frames and estimating, using the gyroscope data associated with the first image frame, a pose corresponding to the first set of feature points. The computer-implemented method further including estimating, using the gyroscope data associated with the second image frame, a pose corresponding to the second set of feature points. The computer-implemented method in which the gyroscope data includes at least a raw estimation of a rotation associated with a mobile device that captured the plurality of image frames, and the gyroscope data is used to estimate pose and image orientation associated with each image frame.

In some implementations, the computer-implemented method may also include determining a plurality of projection locations corresponding to each feature point in the first and second sets of feature points, the determining including for each feature point, coupling position data and orientation data, selecting at least one constraint and applying the constraint to the coupled position data and orientation data, and estimating a camera pose, and providing, to a stitching module, the updated camera pose associated with each feature point in which the stitching module is configured to stitch the plurality of image frames to generate a 3D image of the scene based on the estimated camera pose.

In some implementations, the method may include at least one constraint of an equidistant orbit constraint or a concentric optical axis constraint. The computer-implemented method in which the constraint is selected to reduce search space for a pose estimation algorithm from six degrees of freedom to four degrees of freedom. The computer-implemented method where the sequence of images are captured with a mobile device. The computer-implemented method where the plurality of projection locations correspond to a center of projection of a mobile device that captured the plurality of image frames. Implementations of the described techniques may include hardware, a method or process, or computer software on a computer-accessible medium.

In another general aspect, a system is described that includes one or more computers configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The system may include a computer-implemented system executing on a mobile computing device. The system may include a pose estimation module with at least one processor configured to estimate a camera pose for a sequence of images. The pose estimation module may simulate a uniform image capture path based on a non-uniform image capture path associated with capturing the sequence of images with the mobile computing device.

The system may also include a bundle adjustment module with at least one processor configured to access at least a portion of the sequence of images and adjust the portion for rendering in 3D space. Other embodiments of this aspect include corresponding computer systems, apparatus, and computer programs recorded on one or more computer storage devices, each configured to perform the actions of the methods.

Implementations of the system may also include a uniform image capture path with a path in a single plane and maintaining less than one inflection point in the image capture path. Implementations of the system may also include a non-uniform image capture path includes a path in more than one plane or a capture path with two or more inflection points in the image capture path.

Implementations may include one or more of the following features. The system where the bundle adjustment module is configured to correct for deviations in movement in a plurality of portions of the sequence of images. The system further including a stitching module configured to stitch a plurality of portions of the sequence of images to generate a 3D scene. Implementations of the described techniques may include hardware, a method or process, or computer software on a computer-accessible medium.

Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

The following disclosure describes a number of techniques that can be employed to estimate camera pose in association with a mobile device. The mobile device may be configured to capture and produce omnistereo panoramas. For example, an application running on the mobile device can be used by a user to capture images of a scene. The application can receive the images as they are captured and begin to estimate camera position and camera orientation information (i.e., camera pose) for each image. In some implementations, the received image content includes video content and the application can estimate camera pose information for frames or portions of frames during or after image capture. The application can employ algorithms described in this disclosure to provide two-dimensional (2D) and/or three-dimensional (3D) panoramic or omnistereo panoramic images using captured image content and estimated camera pose information associated with the mobile device.

Estimating camera pose can be performed using algorithms described in this disclosure in combination with a number of particular constraints. Such constraints can be used as stand-alone constraints, in combination, or altogether to estimate a camera pose associated with a mobile device. In general, the algorithms described herein may function to estimate the camera pose by coupling together both camera orientation and camera position information in the same coordinate system. Coupling the camera orientation information with the camera position information can ease the calculations used to estimate camera pose. By coupling the information, the capture method for mobile device-based panoramic capture can be likened to capturing image content using a spherical-shaped trajectory in a coordinate system. Such a capture may be performed by the user holding the mobile device in her hand and swinging (e.g., move) an arm (partially or fully extended) in a circular path that can be formed by passing through points above and below the user's shoulder and directly in front and behind the user at the shoulder level. Alternatively, the circular path may shift toward the user (e.g., above her head) or away from the user (e.g., to the right or left of the user's head). The motion can be used during capture to collect images of a scene. In some implementations, the trajectory of the mobile device during the capture swing may be approximated by a spherical-shaped trajectory with an optical axis of the camera on the mobile device approximately passing through at a point between the user's eyes during the capture. This capture path is an example path and other shifted or alternate shaped paths are possible.

In some implementations, the user can swing (e.g., move) the mobile device in a circular path (or substantially circular path or nearly circular path) to capture panoramic images using a partial arm extension or a full arm extension during a swing. The swing can be likened to an arm circle that swings on the left side of the body of a user or on the right side of the body of a user. The camera position and camera orientation can be coupled according to constraints based on arm extension and based on an orientation associated with the mobile device. For example, a maximum arm constraint can be used because the user's arm is a finite length and cannot be further extended. A mobile device orientation can be determined with (a) assumptions of a user viewing a screen on the mobile device (e.g., during capture), (b) actual measurements from gyroscopes or (c) other sensors on the mobile device. Particular techniques and constraints are described in detail below.

Figure 1:
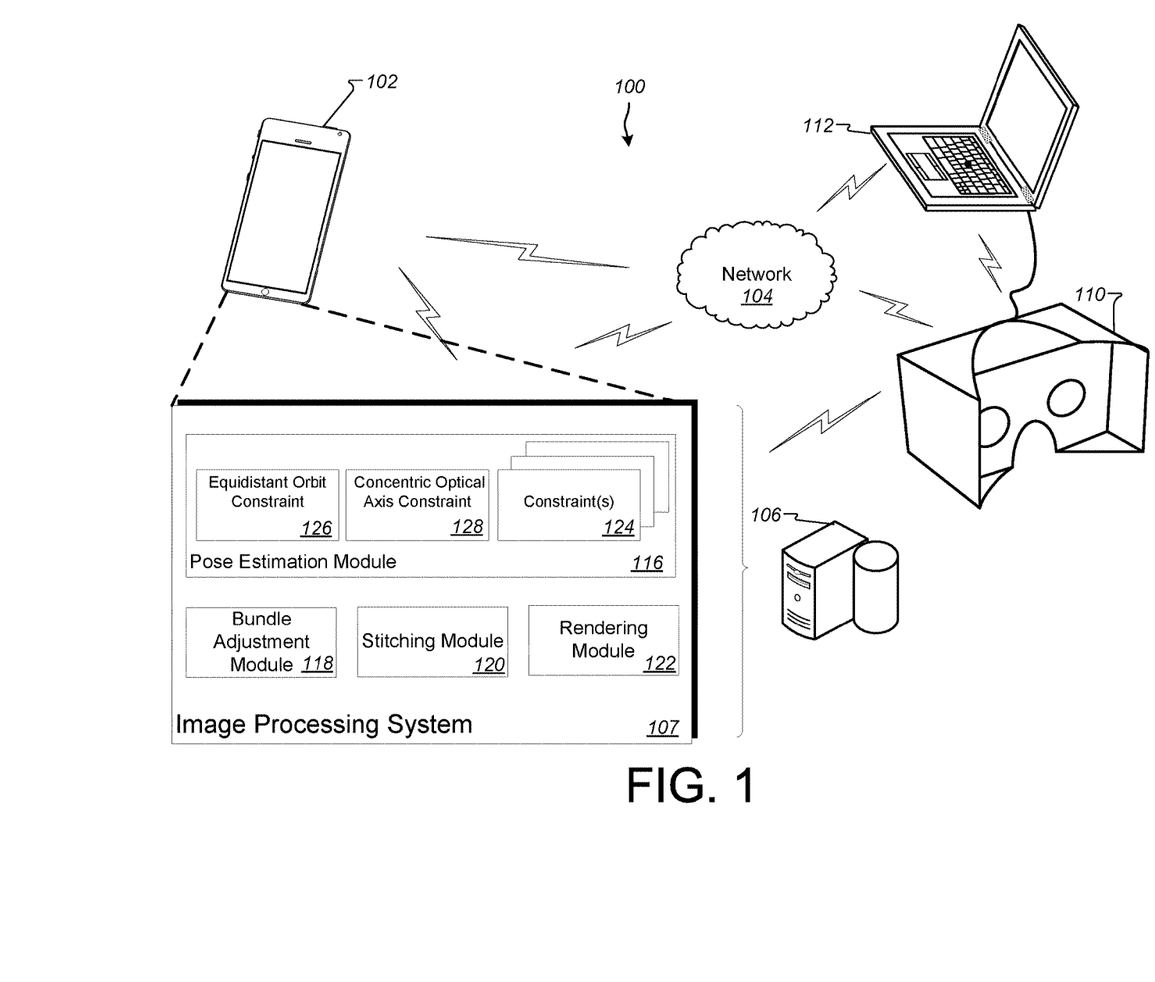
FIG. 1 is a block diagram of an example system for capturing images and estimating camera pose information for rendering the images in a 3D virtual reality (VR) environment.

FIG. 1 is a block diagram of an example system 100 for capturing images and estimating camera pose information for rendering the images in a 3D virtual reality (VR) environment. In the example system 100, a mobile device 102 can be used to capture images and/or video and provide those images or video over a network 104, or alternatively, can provide the images directly to an image processing system 107 for analysis and processing. In some implementations of system 100, the image processing system 107 is provided as part of mobile device 102. In other implementations, portions of image processing system 107 are provided on mobile device 102, while other portions of image processing system 107 are provided on another computing system.

The mobile device 102 may be a mobile phone, an electronic tablet, a laptop, a camera, or other such electronic device that may be used to capture and/or obtain image data.

In some implementations, the mobile device 102 can be configured to capture still images. In some implementations, the mobile device 102 can be configured to capture video and store such content as individual frames or video (e.g., .avi files) and such stored images can be uploaded to the Internet, another server or device, or stored locally on the mobile device 102. In some implementations, incoming images can be stored as encoded images or encoded video. In general, the images described throughout this disclosure may include a plurality of consecutive or non-consecutive image frames of a scene. In some implementations, the images described throughout this disclosure may include a combination of both consecutive sets of images and non-consecutive sets of images. The images may be captured and rendered in two or three dimensions.

In operation of device 102, a user can access a camera (also can be referred to as a capture device) on device 102, hold the device 102 in a selected orientation and pan or sweep the device 102 around to capture images along a capture path. In general, sweeping device 102 around to capture images along a capture path can include having the user move the device 102 around a circular capture path (or a capture path of another shape or profile) surrounding her head or body (or part of a body). In such a sweep, the device 102 may be directed outward away from the user and pointed toward scenery while the user follows the circular capture path (or a capture path of another shape or profile). In some implementations, the capture path can be disposed within, or aligned along, a single plane, can be curved, can have linear portions, can have one or more discontinuities, and/or so forth. In some implementations, the capture path can have portions that are disposed within, or aligned along, more than one plane. While sweeping a path (e.g., a capture path) and capturing images, the mobile device 102 can receive indications to modify particular capture configurations. Capture configurations can include, but are not limited to, mobile device pose/capture positions/angles/pitch/roll, field of view, camera settings for lighting/exposure, horizontal or vertical tilt or twist, speed of camera capture sweep, etc.

Once the images are captured, the image processing system 107 (or mobile device 102) can perform a number of processes on the images to generate panoramic images that can be provided to a head mounted display (HMD) device 110 for rendering over network 104, for example. In some implementations, the image processing system 107 can also provide the processed images to mobile device 102 and/or to computing device 112 for pose estimation, rendering, storage, or further processing.

As shown in FIG. 1, the image processing system 107 includes a pose estimation module 116, a bundle adjustment module 118, a stitching module 120, and a rendering module 122. The pose estimation module 116 can be configured to estimate a pose that is associated with a capture device on a mobile device that captures panoramic images. In particular, the pose estimation module 116 can be configured to determine, for a particular panoramic capture session, a probable position, orientation, and focal length associated with the capture device on the mobile device. The position, orientation, and focal length can be used as inputs into a pose estimation model carried out by the pose estimation module 116. In some implementations, the bundle adjustment module 118 is part of the pose estimation module 116.

In general, pose information for an object can be expressed by combining three linear displacement coordinates (x, y, z) of any reference point on the object, as well as the three inclination angles (i.e., Euler angles ($\varphi$, $\theta$, $\psi$)) that may describe the pitch, yaw and roll of the object. Accordingly, the absolute camera pose for a 3D environment can be measured using an invariant object/feature located in the 3D environment. In some implementations, the absolute pose is expressed with absolute pose data ($\varphi$, $\theta$, $\psi$, x, y, z) that represents Euler rotated object coordinates expressed in world coordinates ($X_o$, $Y_o$, $Z_o$) with respect to a reference location, such as, for example, the world origin. Other conventions for expressing pose data in 3D space and representing all six degrees of freedom (i.e., three translational degrees of freedom and three rotational degrees of freedom) are also supported. Accordingly, similar conventions for expressing estimated camera pose information will be used throughout this disclosure.

The pose estimation module 116 can use one or more constraints 124 to estimate the pose for particular images. Such constraints 124 can be motivated by the available resources used (e.g., memory resources, computational resources, and capture configuration limitations) when capturing panoramic images with a mobile device. That is, memory and computational resources can be limited for mobile device image capture activities and as such, the pose estimation module 116 can employ one or more constraints and techniques to lessen the computational burden on the mobile device 102, while still providing a stereoscopic 3D image. In some implementations, use of constraints 124 can be used to reduce the search space for any of the algorithms used to estimate pose so that the estimation can be robust, yet computationally sparing. In one example, the search space for a pose estimation algorithm described herein can be reduced from six degrees of freedom into four degrees of freedom or three degrees of freedom. For example, if N images exist and the pose estimation module 116 is configured to function without constraints, the number of degrees of freedom [DoF] may be 6*N. If the concentric optical axis constraint 128 is used alone, the DoF is reduced from 6*N to 4*N DoF. If the equidistant orbiting constraint 126 is used, the DoF can be reduced from 6*N DoF to 3*N+3 DoF. If both the concentric optical axis constraint 128 and the equidistant orbiting constraint 126 are used, the DoF can be reduced to 3*N+1 DoF.

In some implementations, the system 100 can employ rules, assumptions, and/or constraints 124 based on two model constraints. For example, the pose estimation module 116 can use a model based on an equidistant orbit constraint 126 to estimate a camera pose for mobile device 102. The equidistant orbit constraint 126 represents a constrained circular-shaped orbit as the user swings an arm around a capture path. This constraint 126 ensures that the orbit the capture path travels is equidistant from a center point because the arm length of the user will not change beyond a maximum limit during capture. Thus, the circular path can be constrained to a maximum of an arm length of the user or slightly less than arm length if, for example, the user swings a bent arm. Constraining the path can provide the advantage of lessening computational requirements used by the mobile device 102 to estimate camera pose for particular imagery.

In another example, the pose estimation module 116 can use a model based on a concentric optical axis constraint 128 to estimate a camera pose. The concentric optical axis constraint 128 represents an assumption that a user can swing any mobile device with a camera in a circular path and in doing so the optical axis of the camera will pass through the world origin ($X_o$, $Y_o$, $Z_o$). Similarly, if multiple cameras are used (i.e., on a camera rig configured to perform the same circular swinging motion), all cameras on the rig may have optical axes that pass through the world origin ($X_o$, $Y_o$, $Z_o$). This constraint 128 can be further defined because when panoramic images are captured with the mobile device 102, the device 102 may be rotating around the head of a user and the optical axis passes through the center of the two eyes, approximately.

In operation of system 100, the equidistant orbiting constraint 126 and the concentric optical axis constraint 128 can be used together or independently, resulting in the following example combinations. In a non-limiting example, the pose estimation module 116 can use the equidistant orbiting constraint 126 and the concentric optical axis constraint 128, in combination. In this example, a center location on the mobile device (i.e., capture device onboard mobile device 102) can be manipulated by a user to rotate on a circular (e.g., spherical) path and as such, the pose estimation module 116 can approximate the center of device 102 to be rotating on a sphere with the optical axis of device 102 passing through the world origin ($X_o$, $Y_o$, $Z_o$).

In another non-limiting example, the pose estimation module 116 can use the equidistant orbiting constraint 126 without the concentric optical axis constraint 128. In this example, the approximate center of device 102 can be modeled to rotate on a sphere with an optical axis of device 102 that may not pass through the center of the sphere.

In another non-limiting example, the pose estimation module 116 can use the concentric optical axis constraint 128 without the equidistant orbiting constraint 126. In this example, the mobile device 102 can be modeled to rotate on a sphere with an optical axis that passes through the world origin ($X_o$, $Y_o$, $Z_o$), but the distance to the world origin may vary. Using the concentric optical axis constraint 128 alone may provide image output that can be stitched into stereoscopic panoramic imagery.

In yet another non-limiting example, the pose estimation module 116 can use neither of the equidistant orbiting constraint 126 or the concentric optical axis constraint 128. In this example, the mobile device 102 can move freely without constrained axes or capture path, however, pose estimation may be time-consuming.

Referring to FIG. 1, the bundle adjustment module 118 can be configured to receive captured content (e.g., video or image frames) from one or more cameras (e.g., mobile device 102) and can estimate a camera pose that can be associated with the captured content. The bundle adjustment module 118 can access a portion (e.g., a bundle) of image frames and adjust the frames for rendering in 3D space. In some implementations, the bundle adjustment module 118 can be used to correct for deviations in camera pose or movement in a number of bundles and the corrected bundles can be stitched together to generate a 3D panoramic image.

In operation, the bundle adjustment module 118 can retrieve or select a bundle of image frames. The bundle of image frames may represent a set of images that may or may not be in sequence. The module 118 can detect, from the bundle of image frames, a first set of feature points in a first frame. The module 118 can then track the first set of feature points in subsequent frames during playback, for example. While tracking the first set of feature points throughout the frames, the module 118 can detect new features that may come into a view as the sequence of frames is scrolled (or played). The new features may be represented by a second set of features in a second frame, for example. The module 118 can track the new features (i.e., the second set of features) in addition to tracking the first set of features.

In some implementations, image processing system 107 may be installed on a mobile computing device. The system 107 may include, among other things, a pose estimation module 116 and a bundle adjustment module 118. The pose estimation module 116 may include at least one processor configured to estimate a camera pose for a sequence of images. The pose estimation module may simulate a uniform image capture path based on a non-uniform image capture path associated with capturing the sequence of images with the mobile computing device.

A uniform image capture path may refer to a relatively smooth capture path that an image capture device follows during capture. In some implementations, the uniform image capture path may refer to a path remaining in a single plane around a shape without sharp turns or inflection points. Such examples include a circle, an ellipse, or similar shapes in which the radius remains constant or semi-constant. In some implementations, a uniform image capture path includes a path in a single plane in which the path maintains less than one inflection point in the image capture path.

A non-uniform image capture path may refer to a combination of jagged and smooth movements along a capture path that an image capture device follows during capture. In some implementations, the non-uniform image capture path may refer to a path in multiple planes. In some implementations, a non-uniform image capture path includes a capture path with two or more inflection points in the image capture path.

The bundle adjustment module 118 may include at least one processor configured to access at least a portion of the sequence of images to adjust the portion for rendering in 3D space, for example. In some implementations, the bundle adjustment module 118 is configured to correct for deviations in movement in a plurality of portions of the sequence of images. In some implementations, the system 107 may also include a stitching module configured to stitch a plurality of portions of the sequence of images to generate a 3D image of the scene. For example, the stitching module can access estimated poses to recraft scenes into a different pose than the scenes were originally captured. The different pose may correct for any number of things including, but not limited to errors, user configurations, display configurations, user capture mistakes, lighting, and the like.

In some implementations, the system 100 can track and store gyroscope data from the mobile device, for example. The gyroscope data may pertain to specific image frames and/or feature points and may include raw estimation data of a camera rotation associated with the mobile device during capture of each specific frame. Such data can be used to estimate an initial estimate for a camera pose associated with the mobile device 102, for example. Using the initial estimate, the system 100 can configure an objective function for an optimization procedure. In addition, the system 100 can configure variables as input to the objective function to include a) 3D locations of the tracked feature point, and b) camera positions and orientations for each of the captured frames (e.g., retrieved from the gyroscope data or other sensor or input to device 102). The system 100 can use the objective function and the 3D locations of the tracked feature points to generate an updated estimate. In some implementations, the system 100 can use a predefined initial estimate for the camera pose in lieu of gyroscope data. An initial estimate may be calculated using the camera pose with respect to calibrating a mapping of 3D feature points in a scene to 2D feature points in the scene in combination with using geometrical measurements of objects in the scene. The initial estimate can defined by system 100 to be used as the actual camera pose until the system 100 can perform additional estimation steps to calculate the camera pose.

The objective function can be configured to project frames from a first image plane into a second image plane. The projection may function to determine any errors in the 3D feature points. The objective function can be used to project the 3D location of the feature points in each of the image frames using the estimated initial camera pose information to find one or more hypothetical projection locations that represent the 3D feature points. The hypothetical projection locations can be compared to the feature point locations that the system 100 has tracked. From this comparison, an error associated with particular feature points can be determined by assessing the differences between the hypothetical projection locations and the tracked feature points. Once the error is determined, system 100 can sum all errors associated with all feature points in a particular bundle to generate the objective function. In general, the system 100 can repeat the initial estimate process to attempt to minimize the objective function and in turn, reduce errors associated with the pose corresponding to particular feature points. For example, the system 100 can search for one or more camera poses (i.e., position and orientation) for the 3D locations that minimize the objective function. The objective function can be used to determine an accurate camera pose to associate with each bundle of images. The result of applying the objective function with a number of estimated camera poses, for each bundle, can enable generation of an accurate, distortion-free panoramic scene.

In some implementations, the bundle adjustment module 118 can be used in combination with the pose estimation module 116 to estimate camera pose for a portion of frames in a particular capture path. In general, the frames used in bundle adjustment module 118 may be encoded as video to optimize performance and playback. The bundle adjustment executed by the bundle adjustment module 118 may include selecting a portion (i.e., bundle) of frames within the image content in which to perform optimization adjustments. The bundle adjustment module 118 can receive estimated camera pose information from the pose estimation module 116, for example, and for each frame in the bundle, module 118 can use the estimated camera pose information to perform a course optimization for the frames in the bundle. The course optimization can be used to stitch the frames in the bundle together (i.e., using stitching module 120). Any number of bundles can be generated from frames within captured image content. The pose estimation module 116 can estimate pose for one or more frames in each bundle and the bundle adjustment module 118 and stitching module 120 can use the estimates to stitch together a panoramic scene.

In some implementations, the bundle adjustment module 118 can be configured to correct images post-capture. For example, after images are captured, module 118 can compensate for a non-circular camera trajectory or sweep, a non-parallel principal (camera) axis, and/or an incorrect viewing-direction with respect to camera trajectory, just to name a few examples.

Referring again to FIG. 1, the stitching module 120 can be configured to blend or stitch columns of pixels from several image frames to remove artifacts and provide distortion-free stereoscopic images. Example artifacts include artifacts due to poor exposure (or exposure changes from image frame to image frame) and/or artifacts due to misalignment errors based on a pose associated with a mobile device camera. In some implementations, the module 120 can blend additional content in between two columns of pixels to provide missing content in image frames. In other implementations, the module 120 can blend additional content in between two columns to remove artifacts in the image frames.

In some implementations, the stitching module 120 can be configured to adjust captured images for rendering in 3D space by correcting for lateral roll movement that occurred during image capture. In some implementations, the stitching module 120 can be configured to adjust captured images for rendering in 3D space by correcting non-conformal camera arc movement that occurred during image capture. In some implementations, the stitching module 120 can be configured to adjust captured images for rendering in 3D space by correcting inconsistent radius measurements (related to the capture path) that occurred during image capture.

In some implementations, the stitching module 120 can determine which columns to stitch (e.g., blend) together. For example, module 120 can analyze captured image data to determine at least one overlap between images. The overlap may include matched columns or regions of pixels from the images, for example. For each overlap found, the module 120 can select a portion of the matched pixels and combine them so that each portion is vertically aligned. The vertically aligned pixels can be combined to generate one segment of a 3D scene, for example. In the event that no overlap is detected, the stitching module 120 can generate additional image content to be blended between the images. The stitched content can be rendered in a head-mounted display to display the content in a VR environment, for example.

In some implementations, the stitching module 120 can be configured to generate 3D stereoscopic images based on images obtained with mobile device 102. The stitching module 120 can be configured to blend pixels and/or image-strips from multiple image portions. In some implementations, blending can be based on flow fields as determined by an image interpolation component (not shown). For example, the stitching module 120 can be configured to determine flow fields (and/or flow vectors) between related pixels in adjacent images. Flow fields can be used to compensate for both transformations that images have undergone and for processing images that have undergone transformations. For example, flow fields can be used to compensate for a transformation of a particular pixel grid of a captured image. In some implementations, module 120 can generate, by interpolation of surrounding images, one or more images that are not part of the captured images, and can interleave the generated images into the captured images to generate additional virtual reality content for a scene adapted for display in a VR environment.

In some implementations, the system 100 can interleave the generated images using depth, alignment, and color correction into account to fill in any visual gaps. For example, the stitching module 120 can be configured to adjust global color correction across all stitched elements in a particular scene. In addition, the system 100 can use estimated camera pose information and image pixel data to adjust color when stitching image frames together. The system 100 can also generate image data to color match other image data and can stitch the generated image data to the other image data. In some implementations, the system 100 can determine depth data from a number of different images and can stitch the different images together into a stereoscopic virtual reality video using the depth information.

In some implementations, the stitching module 120 can estimate optical flow by adjusting particular images. The adjustments can include, for example, rectifying a portion of images, determining an estimated camera pose associated with the portion of images, and determining a flow between images in the portion. In some implementations, the stitching module 120 receives images depicting multiple sweeps of a particular capture path to capture images in a scene. The images corresponding to the multiple sweeps of the capture path can be stitched together to form a 3D stereoscopic view of the scene.

Once the images are properly adjusted and stitched, the rendering module 122 can render the images into a realistic looking scene provided from a virtual viewpoint. For example, module 122 can render a collection of images captured by a mobile device and provide virtual reality content, based on those images, to a user in HMD device 110, for example. Rendered scenes can be based on images captured in a single circular sweep, a partial sweep, multiple sweeps of a scene, and/or at a number of pose positions.

In some implementations, the mobile device 102 can function as the image processing system 107. For example, in the event that combinations of particular images captured with device 102 do not provide an accurate 3D stereoscopic scene, the same device 102 can perform processing on such images to improve or correct the accuracy and rendering of any subsequently generated 3D stereoscopic scene. In particular, the mobile device 102 can be configured with an image processing system to optimize the captured images using pose estimation and flow fields to provide an accurate rendering of a scene for presentation in a VR environment.

In some implementations, the optimization can include stitching together particular image frames. For example, during capture of images, the mobile device 102 can determine which columns of pixels in each captured image frame can be stitched together. The mobile device 102 can analyze the image frames to determine feature points/pixel columns in which stitching would provide a cohesive scene. For each point/column that the mobile device 102 selects for stitching, device 102 can capture placement data for the points/columns and can linearly stitch appropriate points/columns together into a final image. Such optimizations can function to correct exposure inconsistencies, correct camera misalignment/pose errors, and/or correct for missing image frames.

The implementations described in this disclosure can provide one or more advantages. For example, the methods and systems described herein can use a limited field of view associated with a camera on a mobile device, to produce 3D omnistereo images by stitching together content from multiple capture events of a scene. In addition, the methods and systems described herein can ensure that particular content or angles in a scene are correctly captured by estimating camera pose and adjusting the captured images according to the estimated camera pose.

In some implementations, multiple mobile devices can be used to capture images of the scene. For example, mobile device 102 may be one of many mobile devices arranged on a camera rig (not shown) to capture additional images of a particular scene. Such a camera rig can be configured for use as an image capture device and/or processing device to gather image data for rendering content in a VR environment, for example. The rig can include mobile devices configured with video cameras, image sensors, and/or infrared cameras, as well as processing circuitry to process captured images. Image processing system 107 can estimate the camera pose of any or all devices on the camera rig (not shown) for purposes of stitching together portions of images or video captured from the devices.

In the example system 100, HMD device 110 may represent a virtual reality headset, glasses, eyepiece, or other wearable device capable of displaying virtual reality content. In operation, the HMD device 110 can execute a VR application (not shown) which can playback received and/or processed images to a user. In some implementations, the VR application can be hosted by one or more of the devices 102, 106, or 112, shown in FIG. 1. In one example, the HMD device 110 can provide a still representation and/or video playback of a scene captured by mobile device 102. In general, the playback may include images stitched into a 3D stereoscopic and panoramic scene that provides a user with a realistic viewing of the scene.

In the example system 100, the devices 106 and 112 may be a laptop computer, a desktop computer, a mobile computing device, or a gaming console. In some implementations, the devices 106 and 112 can be a mobile computing device that can be placed and/or otherwise located near or within the HMD device 110. The mobile computing device can include a display device that can be used as the screen for the HMD device 110, for example. Devices 102, 106, and 112 can include hardware and/or software for executing a VR application. In addition, devices 102, 106, and 112 can include hardware and/or software that can recognize, monitor, and track 3D movement of the HMD device 110, when these devices are placed in front of or held within a range of positions relative to the HMD device 110. In some implementations, devices 102, 106, and 112 can provide additional content to HMD device 110 over network 104. In some implementations, devices 102, 106, 110, and 112 can be connected to/interfaced with one or all of each other either paired or connected through network 104. The connection can be wired or wireless. The network 104 can be a public communications network or a private communications network.

The system 100 may include electronic storage. The electronic storage can include non-transitory storage media that electronically stores information. The electronic storage may be configured to store captured images, obtained images, pre-processed images, post-processed images, etc. Images captured with any of the disclosed cameras or devices can be processed and stored as one or more streams of video, or stored as individual frames. In some implementations, storage can occur during capture and rendering can occur directly after portions of images are captured to enable access to stereoscopic image content earlier than if capture and processing were concurrent.

Figure 2:
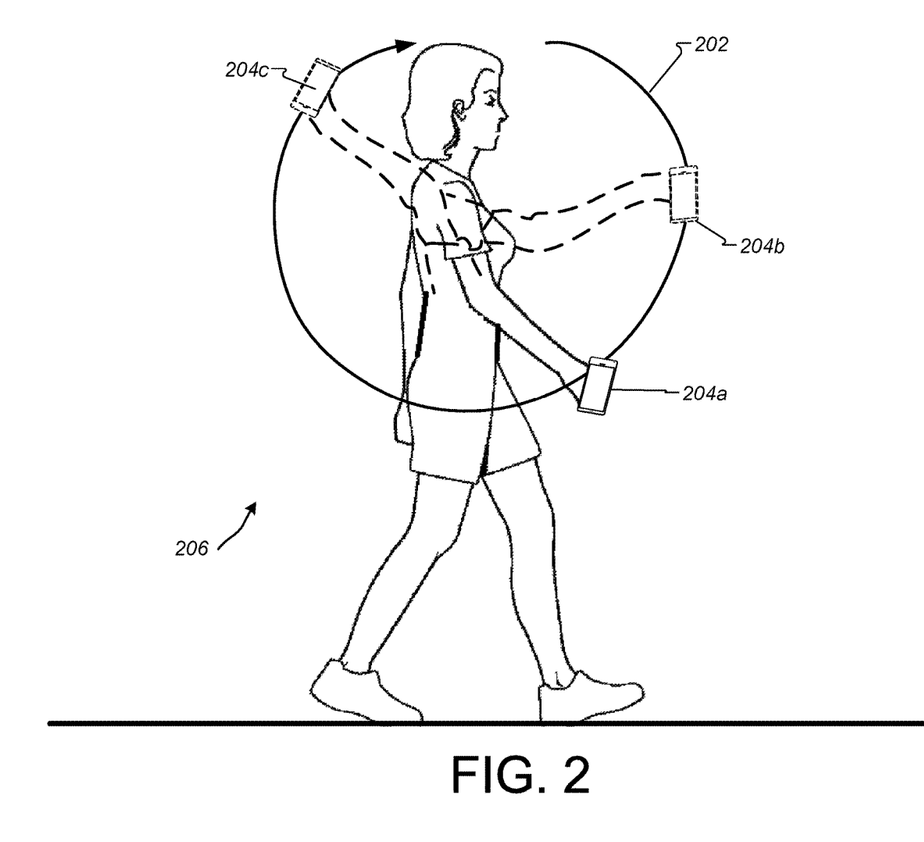
FIG. 2 is a diagram depicting an example capture path for capturing images using a mobile device.

FIG. 2 is a diagram depicting an example capture path 202 for capturing images using a mobile device 102 (e.g., mobile device 204a-c). The mobile device 204a-c shown here represents the device 102 at three locations around the capture path 202 as a user 206 swings her arm in a circular motion to follow path 202. The capture path 202 can be modeled using a number of constraints described above with reference to FIG. 1, for example. As shown, the capture path 202 is about circular in shape. In some implementations, the capture path 202 can be circular, semi-circular, partially circular, elliptical or other variant within arms-length of the user 206.

As described above, capture resources can be tied to particular user capturing techniques, and movements. For example, as a user swings her arm to capture a panoramic view of a scene (e.g., images), the trajectory of the mobile device (e.g., mobile device 102) may be approximated by a spherical-shaped trajectory with an optical axis of the camera on device 102 approximately passing through at a point between the user's eyes during the capture. The user may unintentionally tilt, rotate or otherwise modify her mobile device (e.g., 204a) throughout a trajectory. These modifications can make pose estimation difficult. Accordingly, the constraints associated with the estimation techniques described herein can be used to simulate and/or estimate a stable camera capture path from an unknown or unexpected user-driven camera trajectory. Such constraints may provide the advantage of compact parameterization using minimal computational resources for pose estimation, while enabling faster reconstruction, and stabilizing pose estimation significantly. The constraints can also provide the advantage of ensuring that any subsequent image processing and rendering tasks become computationally less than traditional panoramic capture and pose estimation for mobile devices.

Figure 3:
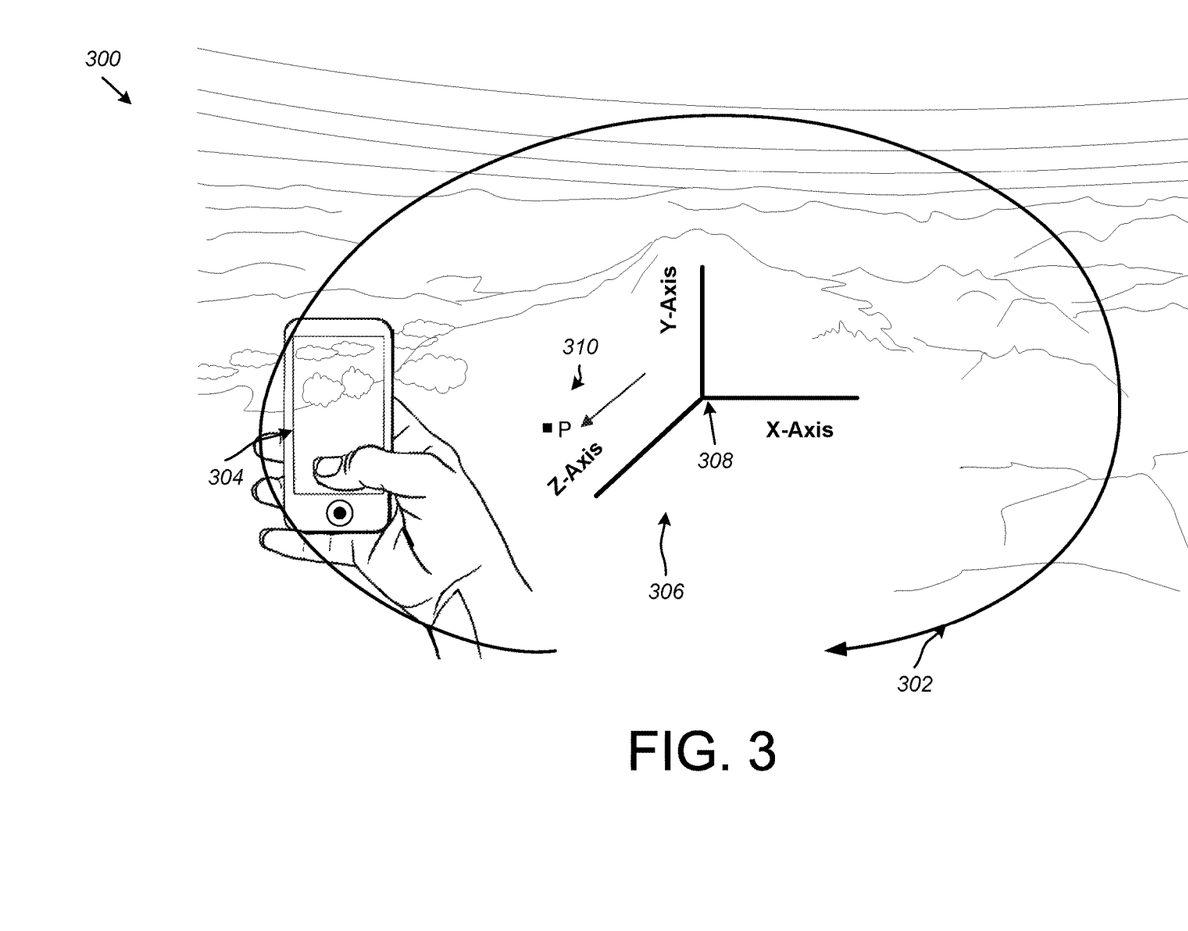
FIG. 3 is a diagram depicting an example capture path traversed by a mobile device to capture panoramic images of a scene.

FIG. 3 is a diagram depicting an example capture path 302 traversed by a mobile device 304 to capture panoramic images of a scene 300. In this example, the user may be actively capturing a view of a scene 300 using an onboard camera on device 304. Portions of the scene are displayed on the device 304 screen as the capture is occurring. The screen can be updated with new scenery as the user sweeps the device 304 across the scene 300.

In the depicted example, the user is holding mobile device 304 in a vertical (e.g., portrait) orientation and sweeping the device 304 along a capture path 302. In some implementations, the device 304 can be held horizontally (e.g., in a landscape orientation) or anywhere in the x-y-z plane 306 to capture a scene facing a camera associated with the mobile device 304. The user can sweep around a circular path around her body by sweeping her arm or moving her entire body in a portion of a circle, a semi-circle or full circle. The user can move the mobile device 304 at varying speeds and can change speeds mid-sweep. In general, the user can sweep the device around an origin 308, which in some examples may represent the world origin $(X_o, Y_o, Z_o)$.

In a non-limiting example, the capture path 302 may be represented as the surface of a sphere-shaped space in which mobile device 304 can sweep around path 302 while capturing images with the onboard camera. Capturing the images may correspond to recording image content with the mobile device 304 by aligning the device 304 to traverse the capture path 302.

The following description includes a number of defined variables and equations that can be used with both the equidistant orbit constraint 126 and the concentric optical axis constraint 128 described in FIG. 1 above. The variables include [k] to represent a camera, [X_k] to represent a pixel location for a camera [k], [P] to represent a projection 310 or point in the world that a camera [k] is capturing, [R_k] to represent a rotation of a camera and [T_k] to represent a translation of a camera transform. The variables also include [O_k] to represent the negative inverse of [R_k]*[T_k], which represents a position of the camera [k] at the camera center. The variables additionally include matrix [C] to represent a 3×3 camera intrinsic matrix where [X_k] is equal to [x_k; y_k; 1] to represent an x-y pixel location of the projection of [P] 310 in a camera [k]. Matrix [C] can contain camera focal length data, skew factor data, pixel aspect ratio data, and principal points as elements. The matrix [C] can function to map a 3D point position in a scene to a 2D pixel coordinate in an image. In some implementations, the model can be written as [X_k]=[C]*[R_k]*([P]−[O_k]) or alternatively written as [X_k]=[C] *[R_k] *[P]+[T_k]. The model can be applied using a number of combinations of the constraints. The following examples can be selectively implemented by the image processing system 107 and pose estimation module 116 to estimate camera pose associated with a camera [k].

In a non-limiting example, the pose estimation module 116 can use the equidistant orbit constraint 126 to estimate a camera pose. For example, the pose estimation module 116 can define that all cameras [k] share the same translation vector for the translation of a camera transform (i.e., [T_k]=[T_0] for all cameras [k]$_n$. Although the camera translation vectors are the same in this example, the camera center position [O_k] (which is equal to the negative inverse of [R_k] *[T_0]) for each of [T_k] can still differ from each other. However, when using the equidistant orbit constraint, all of the camera [k] centers may be considered to be constrained on a spherical surface. This constraint is generally motivated from the user-based motion of capturing a panoramic set of images by sweeping her arm and in doing so the position of the mobile device 304 in her hand may be assumed to be approximately rotating on a sphere.

In a non-limiting example, the pose estimation module 116 can use the concentric optical axis constraint 128 to estimate a camera pose. For example, when using concentric optical axis, only the z-axis component of each translation [T_k] may be nonzero. That is, [T_k]=[0; 0; t_k]. The concentric optical axis constraint 128 may define that any or all of the cameras' optical axis pass through the world origin 308.

Figure 4:
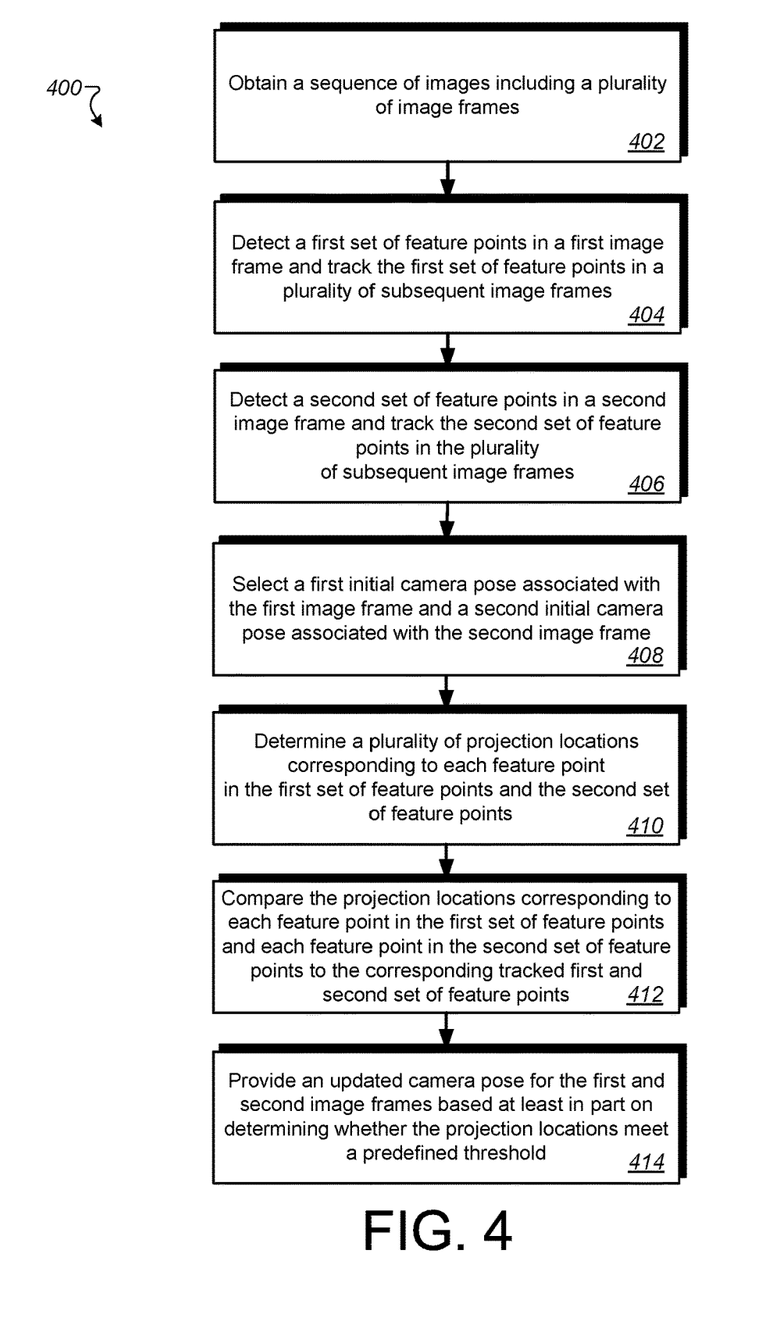
FIG. 4 is a flow chart diagramming one embodiment of a process to estimate a camera pose for a mobile device.

FIG. 4 is a flow chart diagramming one embodiment of a process 400 to estimate a camera pose for a mobile device. In various embodiments, the procedure 400 may be used or produced by the systems such as those of FIGS. 1 and 5. In some implementations, the process 400 is carried out on a mobile device. In some implementations, the process 400 is carried out on a computing device other than the mobile device.

Block 402 illustrates that, in one embodiment, the system 100 can obtain a sequence of images. The sequence of images may be captured with a mobile device 102 and obtained from the device 102 or another computing device or storage device. The sequence of images can include a plurality of image frames of any or all portions of a scene.

At block 404, the system 100 can detect a first set of feature points in a first image frame and track the first set of feature points in a plurality of subsequent image frames. For example, as the sequence of images is presented to a computing device (e.g., during playback or editing), the system 100 can detect feature points and track the feature points as they appear during playback and after additional frames and feature points are presented on the computing device. The tracking can include indexing object location data, pose data, and/or other image data in such a way that system 100 can retrieve the data at a later time to perform stitching and rendering tasks.

While continuing to track the first set of feature points, the system 100 can detect a second set of feature points in a second image frame. The system 100 can also track the second set of feature points in the plurality of subsequent image frames, at block 406.

At block 408, the system 100 can select a first initial camera pose associated with the first image frame and a second initial camera pose associated with the second image frame. The first and second initial camera poses may correspond to a hypothesis of location and pose information for image frames captured with mobile device 102. For example, the system 100 can determine that the user is swinging her arm while holding mobile device 102 to capture images and in doing so, she is looking at the screen of the mobile device 102. If the user is looking at the screen of the mobile device 102, the system 100 can determine specific angles of capture that can be used to calculated camera pose information. The system 100 can use this assumption and/or other constraints to determine a capture path and distances from the mobile device 102 to objects in the scene.

In some implementations, selecting a first initial camera pose and a second initial camera pose can include obtaining gyroscope data associated with each image frame in the plurality of image frames and estimating, using the gyroscope data associated with the first image frame, a pose corresponding to the first set of feature points and estimating, using the gyroscope data associated with the second image frame, a pose corresponding to the second set of feature points. In some implementations, the gyroscope information can include at least a raw estimation of a rotation associated with a mobile device that captured the plurality of image frames. In some implementations, the gyroscope information may be used to estimate pose and image orientation associated with each image frame.

At block 410, the system 100 can determine a plurality of projection locations corresponding to each feature point in the first set of feature points and the second set of feature points. The projection locations, in world coordinates, correspond to the center of projection of the camera on mobile device 102 during capture of particular feature points. For example, the projection locations may correspond to a center of projection associated with device 102 for a time point at which the second image frame was captured. Similarly, the projection locations may correspond to a center of projection associated with device 102 for a time point at which the second image frame was captured, for example The projection locations can be calculated based at least in part on the first initial camera pose and the second initial camera pose. Calculating the projection may include transforming the projection into a perspective view that can be applied to a 3D coordinate system associated with the mobile device 102, for example.

In some implementation, determining a plurality of projection locations corresponding to each feature point in the first and second sets of feature points includes calculating the projections for each feature point by coupling position data and orientation data so that the pose is calculated using the coupled pair as a single representation instead of being calculated with an independent pose metric and an independent orientation metric. The method to determine the plurality of projection locations can also include selecting at least one constraint and applying the constraint to the coupled position data and orientation data for each feature point in the first and second sets of feature points. For example, the system 100 can apply the equidistant orbit constraint or the concentric optical axis constraint separately. In some implementations, the system 100 can apply both the equidistant orbit constraint and the concentric optical axis constraint in a combined fashion. In some implementations, particular constraints are selected as a way to reduce search space for the algorithm described herein. The reduction can include reducing the search space from six degrees of freedom to four degrees of freedom. The method to determine the plurality of projection locations can further include estimating a camera pose for each feature point in the first and second sets of feature points.

The process 400 can also include providing a stitching module, the estimated camera pose associated with each feature point, the stitching module configured to stitch the plurality of image frames to generate a 3D image of a scene. In some implementations, the process 400 can include performing the above on all of the feature points in all of the image frames captured by device 102. In other implementations, the process 400 can include performing the above steps on a portion of the feature points and/or a portion of the image frames.

At block 412, the system 100 can compare the projection locations corresponding to each feature point in the first set of feature points and each feature point in the second set of feature points to the corresponding tracked first and second set of feature points. The comparison can be used to determine errors in camera pose in order to improve the image content for stitching tasks at a later time. For example, using this comparison, an error associated with particular feature points can be determined by assessing differences between the hypothetical or initial projection locations and the tracked feature points. Once the error is determined, the system 100 can sum all errors associated with corresponding feature points in a particular bundle to generate a block of image content that can be stitched.

At block 414, the system 100 can provide an updated camera pose for the first and second image frames based at least in part on determining whether the projection locations meet a predefined threshold associated with the tracked first and second set of feature points. The predefined threshold may pertain to distortion level, parallax requirements, image metrics, etc. For example, the system 100 can be configured to analyze the tracked first and second set of feature points to ensure (using a predefined distortion level) that the associated projection locations do not exceed a particular distortion percentage for a particular scene or image. Similarly, the system 100 can be configured to ensure (using a predefined parallax threshold) that the projection locations do not exceed parallax discomfort levels for a human being. Such predefined thresholds can function to ensure the updated camera pose provides a scene or image with little or no distortion while providing proper parallax to a human being.

Figure 5:
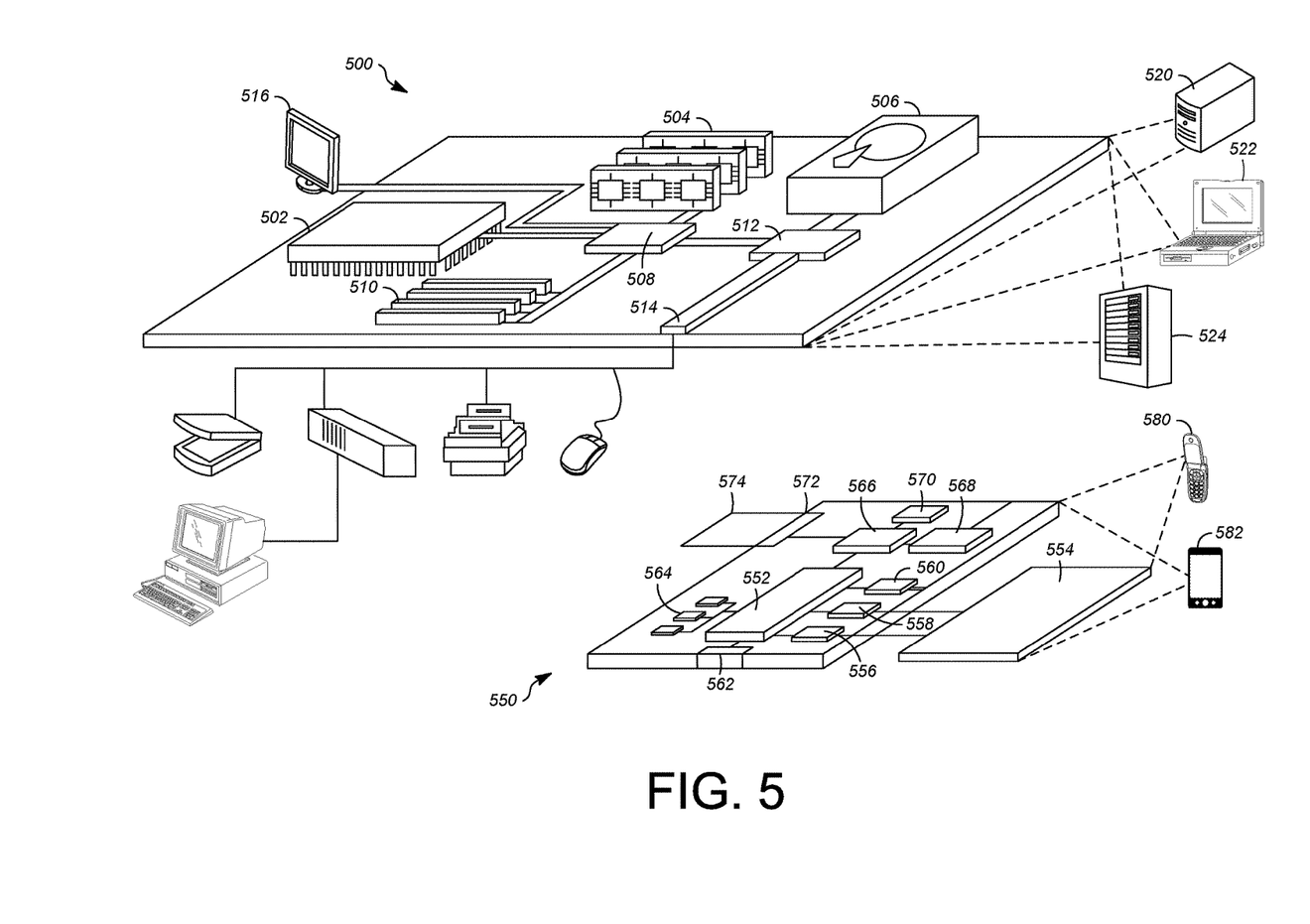
FIG. 5 is an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor sy stem).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

According to exemplary embodiments, systems and methods are described for estimating a camera pose. The estimation may include obtaining a sequence of images including a plurality of image frames of a scene, detecting a first set of feature points in a first image frame, and tracking the first set of feature points in a plurality of subsequent image frames. While continuing to track the first set of feature points, the estimation can include detecting a second set of feature points in a second image frame, tracking the second set of feature points, selecting a first initial camera pose associated with the first image frame and a second initial camera pose associated with the second image frame, determining projection locations, the projection locations based on the first initial camera pose and the second initial camera pose, and comparing the projection locations corresponding to each feature point in the first and second sets of feature points.

In the following, further examples of the system and method according to the present disclosure are described.

A first example concerns a computer-implemented method comprising: obtaining a sequence of images including a plurality of image frames of a scene; detecting a first set of feature points in a first image frame; tracking the first set of feature points in a plurality of subsequent image frames and while continuing to track the first set of feature points: detecting a second set of feature points in a second image frame; tracking the second set of feature points in the plurality of subsequent image frames; selecting a first initial camera pose associated with the first image frame and a second initial camera pose associated with the second image frame; determining a plurality of projection locations corresponding to each feature point in the first set of feature points and the second set of feature points, the projection locations based at least in part on the first initial camera pose and the second initial camera pose; comparing the projection locations corresponding to each feature point in the first set of feature points and each feature point in the second set of feature points to the corresponding tracked first set of feature points and the tracked second set of feature points; and in response to determining that the projection locations meet a predefined threshold associated with the tracked first and second set of feature points, generating an updated camera pose for the first image frame and the second image frame.

A second example concerns the method according to the first example further comprising providing the updated camera pose for the first image frames and the second image frames based at least in part on determining that the projection locations meet the predefined threshold.

In a third example based on the first or second example, selecting a first initial camera pose and a second initial camera pose includes obtaining gyroscope data associated with each image frame in the plurality of image frames and estimating, using the gyroscope data associated with the first image frame, a pose corresponding to the first set of feature points.

A fourth example concerns the method according to the third example, further comprising estimating, using the gyroscope data associated with the second image frame, a pose corresponding to the second set of feature points.

In a fifth example based on the third or fourth example the gyroscope data includes at least a raw estimation of a rotation associated with a mobile device that captured the plurality of image frames, and the gyroscope data is used to estimate pose and image orientation associated with each image frame.

A sixth example is based on one of the first to fifth example wherein determining a plurality of projection locations corresponding to each feature point in the first and second sets of feature points includes: for each feature point: coupling position data and orientation data; selecting at least one constraint and applying the constraint to the coupled position data and orientation data; and estimating a camera pose; and providing, to a stitching module, the updated camera pose associated with each feature point, the stitching module configured to stitch the plurality of image frames to generate a 3D image of the scene based on the estimated camera pose.

A seventh example is based on the sixth example, wherein the at least one constraint includes an equidistant orbit constraint or a concentric optical axis constraint.

An eighth example is based one of the sixth or seventh example, wherein the constraint is selected to reduce search space for a pose estimation algorithm from six degrees of freedom to four degrees of freedom.

A ninth example is based on one of the first to eighth example, wherein the sequence of images are captured with a mobile device.

A tenth example is based on one of the first to ninth example, wherein the plurality of projection locations correspond to a center of projection of a mobile device that captured the plurality of image frames.

An eleventh example concerns a system comprising: at least one processor; memory storing instructions that, when executed by the at least one processor, cause the system to perform operations including: obtaining a sequence of images including a plurality of image frames of a scene; detecting a first set of feature points in a first image frame; tracking the first set of feature points in a plurality of subsequent image frames and while continuing to track the first set of feature points: detecting a second set of feature points in a second image frame; tracking the second set of feature points in the plurality of subsequent image frames; selecting a first initial camera pose associated with the first image frame and a second initial camera pose associated with the second image frame; determining a plurality of projection locations corresponding to each feature point in the first set of feature points and the second set of feature points, the projection locations based at least in part on the first initial camera pose and the second initial camera pose; comparing the projection locations corresponding to each feature point in the first set of feature points and each feature point in the second set of feature points to the corresponding tracked first set of feature points and the tracked second set of feature points; and in response to determining that the projection locations meet a predefined threshold associated with the tracked first and second set of feature points, generating an updated camera pose for the first image frames and the second image frames.

A twelfth example is based on the eleventh example further comprising providing the updated camera pose for the first image frames and the second image frames based at least in part on determining that the projection locations meet the predefined threshold.

A thirteenth example is based on the eleventh or twelfth example, wherein selecting a first initial camera pose and a second initial camera pose includes obtaining gyroscope data associated with each image frame in the plurality of image frames and estimating, using the gyroscope data associated with the first image frame, a pose corresponding to the first set of feature points.

A fourteenth example based the thirteenth example further comprises estimating, using the gyroscope data associated with the second image frame, a pose corresponding to the second set of feature points.

In a fifteenth example based on one of the thirteenth or fourteenth example the gyroscope data includes at least a raw estimation of a rotation associated with a mobile device that captured the plurality of image frames, and the gyroscope data is used to estimate pose and image orientation associated with each image frame.

In a sixteenth example based on one of the eleventh to fifteenth example determining a plurality of projection locations corresponding to each feature point in the first and second sets of feature points includes: for each feature point: coupling position data and orientation data; selecting at least one constraint and applying the constraint to the coupled position data and orientation data; and estimating a camera pose; and providing, to a stitching module, the updated camera pose associated with each feature point, the stitching module configured to stitch the plurality of image frames to generate a 3D image of the scene based on the estimated camera pose.

In a seventeenth example based on the sixteenth example the at least one constraint includes an equidistant orbit constraint or a concentric optical axis constraint.

In an eighteenth example based on the sixteenth or seventeenth example the constraint is selected to reduce search space for a pose estimation algorithm from six degrees of freedom to four degrees of freedom.

In a nineteenth example based on one of the eleventh to eighteenth example, the sequence of images are captured with a mobile device.

In a twentieth example, based on one of the eleventh to the nineteenth example, the plurality of projection locations correspond to a center of projection of a mobile device that captured the plurality of image frames.

What is claimed is:

1. A computer-implemented method comprising:
    obtaining a sequence of images including a plurality of image frames of a scene;
    detecting a first set of feature points in a first image frame;
    tracking the first set of feature points in a plurality of subsequent image frames and while continuing to track the first set of feature points:
    detecting a second set of feature points in a second image frame;
    tracking the second set of feature points in the plurality of subsequent image frames;
    selecting a first initial camera pose associated with the first image frame and a second initial camera pose associated with the second image frame;
    determining a plurality of projection locations corresponding to each feature point in the first set of feature points and the second set of feature points, the respective projection locations based at least in part on the first initial camera pose and the second initial camera pose;

comparing the projection locations corresponding to each feature point in the first set of feature points and each feature point in the second set of feature points to the corresponding tracked first set of feature points and the tracked second set of feature points; and in response to determining that the projection locations meet a predefined threshold corresponding to distortion associated with the tracked first set of feature points and the tracked second set of feature points, generating an updated camera pose for the first image frame and the second image frame.

2. The computer-implemented method of claim 1, further comprising generating a 3D image of the scene using the updated camera pose for the first image frame and the second image frame based at least in part on determining that the projection locations meet the predefined threshold.

3. The computer-implemented method of claim 1, wherein selecting the first initial camera pose and the second initial camera pose includes obtaining gyroscope data associated with each image frame in the plurality of image frames and estimating, using gyroscope data associated with the first image frame, a pose corresponding to the first set of feature points.

4. The computer-implemented method of claim 3, further comprising estimating, using gyroscope data associated with the second image frame, a pose corresponding to the second set of feature points.

5. The computer-implemented method of claim 3, wherein the gyroscope data associated with each image frame includes at least a raw estimation of a rotation associated with a mobile device that captured a respective image frame in the plurality of image frames, and the gyroscope data is used to estimate pose and image orientation associated with each respective image frame.

6. The computer-implemented method of claim 1, wherein determining a plurality of projection locations corresponding to each feature point in the first set of feature points and the second set of feature points includes:
for each feature point:
coupling position data and orientation data;
selecting and applying at least one constraint to the coupled position data and orientation data; and
estimating a camera pose; and
providing, to a stitching module, the estimated camera pose associated with each feature point, the stitching module configured to stitch together the plurality of image frames to generate a 3D image of the scene based on the estimated camera pose for each feature point.

7. The computer-implemented method of claim 6, wherein the at least one constraint includes an equidistant orbit constraint or a concentric optical axis constraint.

8. The computer-implemented method of claim 6, wherein the at least one constraint is selected to reduce search space for a pose estimation algorithm from six degrees of freedom to four degrees of freedom.

9. The computer-implemented method of claim 1, wherein the sequence of images is captured with a mobile device.

10. The computer-implemented method of claim 1, wherein the plurality of projection locations correspond to a center of projection of a mobile device that captured the plurality of image frames.

11. A system comprising:
at least one processor;
memory storing instructions that, when executed by the at least one processor, cause the system to perform operations including,
obtaining a sequence of images including a plurality of image frames of a scene;
detecting a first set of feature points in a first image frame;
tracking the first set of feature points in a plurality of subsequent image frames and while continuing to track the first set of feature points:
detecting a second set of feature points in a second image frame;
tracking the second set of feature points in the plurality of subsequent image frames;
selecting a first initial camera pose associated with the first image frame and a second initial camera pose associated with the second image frame;
determining a plurality of projection locations corresponding to each feature point in the first set of feature points and the second set of feature points, the respective projection locations based at least in part on the first initial camera pose and the second initial camera pose;
comparing the projection locations corresponding to each feature point in the first set of feature points and each feature point in the second set of feature points to the corresponding tracked first set of feature points and the tracked second set of feature points; and
in response to determining that the projection locations meet a predefined threshold corresponding to distortion associated with the tracked first set of feature points and the tracked second set of feature points, generating an updated camera pose for the first image frame and the second image frame.

12. The system of claim 11, further comprising generating a 3D image of the scene using the updated camera pose for the first image frame and the second image frame based at least in part on determining that the projection locations meet the predefined threshold.

13. The system of claim 11, wherein determining a plurality of projection locations corresponding to each feature point in the first set of feature points and the second set of feature points includes:
for each feature point:
coupling position data and orientation data;
selecting and applying at least one constraint to the coupled position data and orientation data; and
estimating a camera pose; and
providing, to a stitching module, the estimated camera pose associated with each feature point, the stitching module configured to stitch together the plurality of image frames to generate a 3D image of the scene based on the estimated camera pose for each feature point.

14. The system of claim 13, wherein the at least one constraint includes an equidistant orbit constraint or a concentric optical axis constraint.

15. The system of claim 11, wherein the sequence of images is captured with a mobile device.

16. A computer-implemented system executing on a mobile computing device, the computer-implemented system including:
a pose estimation module including at least one processor configured to estimate a camera pose for a sequence of images, the pose estimation module simulating a uniform image capture path based on a non-uniform image capture path associated with capturing the sequence of images with the mobile computing device the uniform capture path being used to generate an updated estimate of the camera pose; and a bundle adjustment module including at least one processor configured to access at least a portion of the sequence of images and adjust the portion for rendering in 3D space according to the updated estimated camera pose to correct for deviations in movement that occurred to the mobile computing device during the capturing of the sequence of images.

17. The system of claim 16, wherein the bundle adjustment module is configured to correct for deviations in movement in a plurality of portions of the sequence of images.

18. The system of claim 16, further comprising a stitching module configured to stitch a plurality of portions of the sequence of images to generate a 3D scene.

19. The system of claim 16, wherein the uniform image capture path includes a path in a single plane and maintaining less than one inflection point in the image capture path.

20. The system of claim 16, wherein the non-uniform image capture path includes a path in more than one plane or a capture path with two or more inflection points in the image capture path.

* * * * *